US012567093B2

(12) United States Patent
Lanfranchi

(10) Patent No.: US 12,567,093 B2
(45) Date of Patent: Mar. 3, 2026

(54) AUTOMATED NEGOTIATION AGENT WITH OPPONENT'S BEHAVIOR PREDICTION

(71) Applicant: Claudio Lanfranchi, Houston, TX (US)

(72) Inventor: Claudio Lanfranchi, Houston, TX (US)

( * ) Notice: Subject to any disclaimer, the term of this patent is extended or adjusted under 35 U.S.C. 154(b) by 209 days.

(21) Appl. No.: 16/895,696

(22) Filed: Jun. 8, 2020

(65) Prior Publication Data

US 2022/0172264 A1 Jun. 2, 2022

Related U.S. Application Data

(60) Provisional application No. 62/860,253, filed on Jun. 12, 2019.

(51) Int. Cl.
| | |
|---|---|
| *G06Q 30/0601* | (2023.01) |
| *G06N 5/01* | (2023.01) |
| *G06N 5/04* | (2023.01) |
| *G06N 20/20* | (2019.01) |

(52) U.S. Cl.
CPC ........... *G06Q 30/0611* (2013.01); *G06N 5/01* (2023.01); *G06N 5/04* (2013.01); *G06N 20/20* (2019.01)

(58) Field of Classification Search
CPC .... G06Q 30/0611; G06N 20/20; G06N 5/003; G06N 5/04

USPC .................................................. 705/26.4, 80
See application file for complete search history.

(56) References Cited

U.S. PATENT DOCUMENTS

2014/0074646 A1* 3/2014 Ozonat .............. G06Q 30/0611
705/26.4
2020/0020061 A1 1/2020 Sunder

OTHER PUBLICATIONS

Tim Baarslag; What to Bid and When to Stop; 2014; p. 1-330.*

(Continued)

*Primary Examiner* — Igor N Borissov

(57) ABSTRACT

Software based intelligent agents performing automated negotiations for the generation of offers leading to settlements that maximize the utility. A set of opponent's models, which best represents the opponent's profile, behavior, and cognitive orientation, is paired to a set of hypothetical agents. The hypothetical agent and the associated opponent model bargains against each other to generate a hypothetical sequence of proposed agent's offers and predicted opponent's counter offers. An ensemble unifies the proposed and predicted sequences based on the current and past performance measured according to the accuracy of the opponent's behavior prediction and agent's utility maximization. The opponent's adopted tactic is dynamically learned during the negotiation to update the opponent's model. The initial belief about the probability distribution of the opponent's preferences and internal states is set according to the historical negotiation's data. The belief is revised according to observed outcomes of the current negotiation.

3 Claims, 5 Drawing Sheets

(56)　　　　　　　References Cited

OTHER PUBLICATIONS

Kunihiko Fukushima; "Neocognitron: A Self-organizing Neural Network Model for a Mechanism of Pattern Recognition Unaffected by Shift in Position"; Biol. Cybernetics 36, 193 202 (1980); pp. 10.*

Frank Rosenblatt; "Principles of Neurodynamics: Perceptrons and the Theory of Brain Mechanisms"; Cornell Aeronautical Laboratory, Inc., Cornell University. (1962) pp. 626.*

Long Short-Term Memory (LSTM)—was published in a technical report by Sepp Hochreiter; Jürgen Schmidhuber; "Long Short-Term Memory"; Neural Computation 9(8) 1735-1780, 1997. pp. 32.*

* cited by examiner

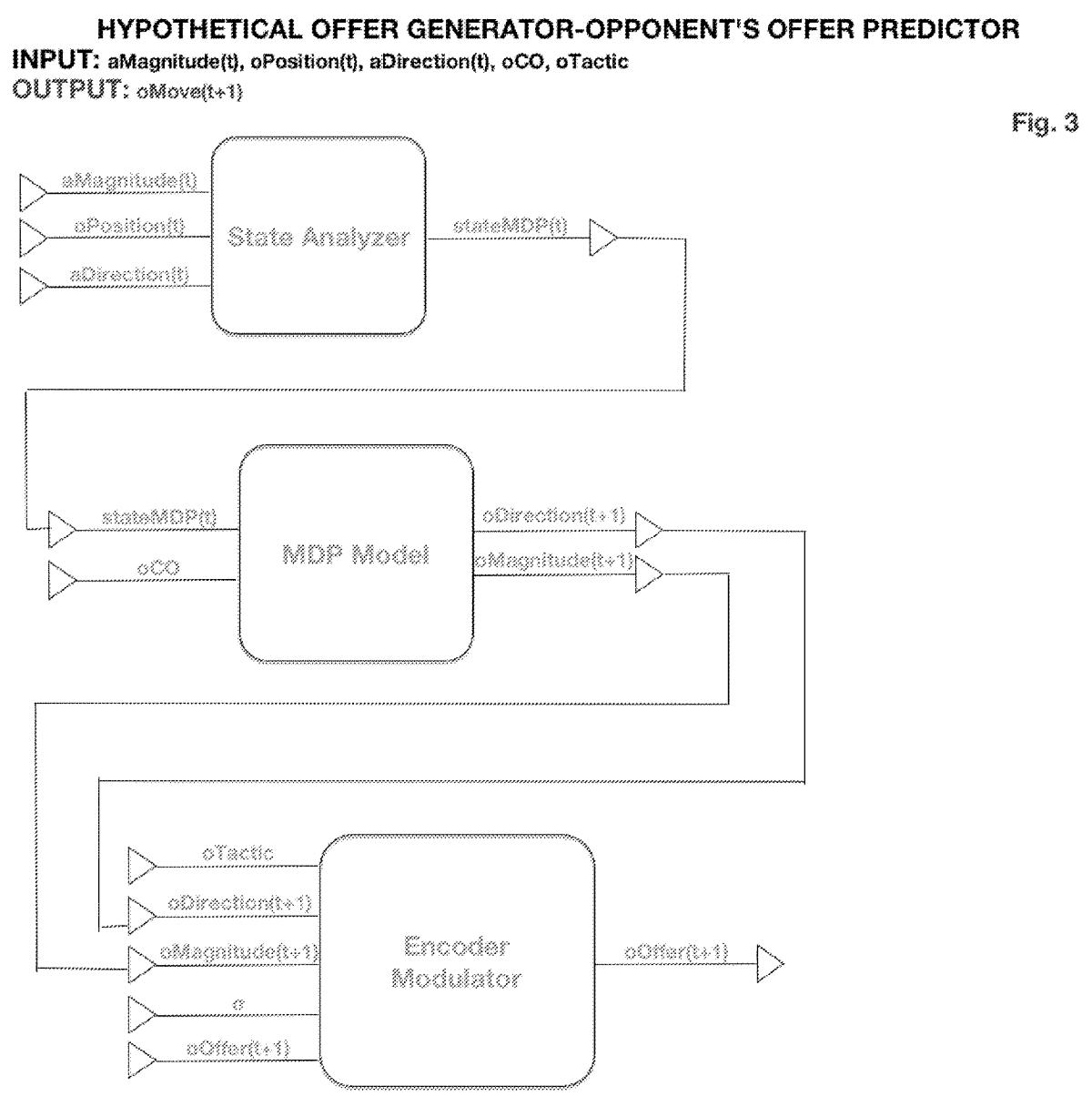

HYPOTHETICAL OFFER GENERATOR-OPPONENT'S OFFER PREDICTOR

INPUT: aMagnitude(t), oPosition(t), aDirection(t), oCO, oTactic

OUTPUT: oMove(t+1)

Fig. 3

HYPOTHETICAL OFFER GENERATOR-AGENT'S OFFER PROPOSER
INPUT: aMagnitude(t), aPosition(t), aDirection(t), aTactic, aOffer(t), oOffer(t+1)
OUTPUT: aOffer(t+1)

OPPONENT'S MOVES OBSERVER

INPUT: oMove, aMove, ~ oMove(o..t), oProfile, oBig5
OUTPUT: oPosition, oAction, oMagnitude, oMAX, oRP, oTactic, oCO

AUTOMATED NEGOTIATION AGENT WITH OPPONENT'S BEHAVIOR PREDICTION

CROSS-REFERENCE TO RELATED APPLICATIONS

This invention relates to U.S. Provisional Application No. 62/860,253, filed Jun. 12, 2019.

FIELD OF THE INVENTION

The present invention relates to intelligent agent computer programs executable on computer systems. To be more specific, this invention pertains to automated negotiation such that an automated negotiation agent can negotiate on behalf of a consumer and/or business. The goal of the automated agents is not only to replace the human negotiators but to find better outcomes than human negotiators. In certain non-limiting embodiments, this invention relates to different real-world domaines ranging from e-commerce to mediation for conflict settlement as part of the Alternative Dispute Resolution (ADR) process, and including operating systems for distribute architectures which negotiate resources allocation. In other non-limiting embodiments, this invention relates to trajectories negotiation amongst autonomous vehicles, cyclists and pedestrians.

BACKGROUND

Competitive negotiation can be described as the decision-making process of resolving a conflict involving two or more parties over a single mutually exclusive goal. Typical example is the exchange of an object between a buyer and a seller where a price has to be agreed. The negotiation protocol consist of three actions: make an offer, accept the offer, interrupt the negotiation. Buyer and Seller makes offers and counter offers sequentially as described in the three-stage Rubinstein (Perfect equilibrium in a bargaining, 1982) sequential-bargaining game. In game theory, it is described as a zero-sum game where a shift in the value along a single dimension in either direction means that one side is better off and the other is worse off. Thus, the self-interest of a party in negotiation may be captured by a utility function:

$$U_b(i) = \frac{MAX_b - X_b(i)}{MAX_b - MIN_b}$$

where Ub is the utility of the buyer at the negotiation round i, MAX is the maximum amount that the buyer is willing to pay, MIN is the amount corresponding to the opening offer. The utility function for the seller is $$U_s(i) = \frac{X_s(i) - MIN_s}{MAX_s - MIN_s}.$$

It is important to note that there is a range of possible situations that the parties can agree on: this is the Zone Of Possible Agreement (ZOPA) or the bargaining zone if $MAX_b > MIN_s$.

In the negotiation process, one party tries to maximize his or her utility, and the behavior of a party in any moment of negotiation is decided by an established strategy. Agents implement strategies that usually vary from equilibrium strategies through optimal approaches to heuristics. Examples of agents among others, Sycara and Zeng (1996), who introduce a generic agent called Bazaar, Faratin, Sierra, and Jennings (2002), who propose an agent that is able to make trade-offs in negotiations and is motivated by maximizing the joint utility of the outcome as utility maximizers that seek Pareto-optimal agreements. These strategies are the result of the analytic (equilibrium strategies) and the computation research (optimal approaches). The former creates elegant and simplified models that provide insights and often formal guarantees about optimality or model behavior, whereas the latter aims to incorporate additional factors in the analytic models thus making them more realistic (Katia Sycara and Tinglong Dai in Agent Reasoning in Negotiation). Pure mathematical models are currently oversimplified versions of reality. Heuristic approximate solutions to analytic models of high computational complexity but need extensive evaluation, typically through simulations and empirical analysis. Thus, neither the pure optimal or the pure heuristic approach guarantee the implementation of effective agent strategies.

Some strategies are opponent independent. To avoid exploitation, agents often keep their preferences private during the negotiation; however, if an agent has no knowledge about its opponent's preferences, then this can result in a suboptimal outcome. A common technique to counter this is learning the opponent's preference profile during the negotiation, which aids in increasing the quality of the negotiation outcome by identifying bids that are more likely to be accepted by the opponent. Previous approaches to negotiation agents have focused on agents unable to predict the opponent's behavior and therefore very often they were implementing negotiation strategies which failed to persuade the opponent towards the agent's desired outcome. Paruchuri (2009) is a first attempt to analytically model agents social motives and their potential adaptation during the negotiation process. They model agents selfish/prosocial motivation as part of the state in a Partially-Observable Markov Decision Process (POMDP) model, and provide possibilities for negotiating agents to learn each others social motives through interactive moves. If there have been previous negotiations with a similar opponent, the opponent model can be prepared before the start of the negotiation (offline models). Contrastingly, if the agent has to learn the preferences during the negotiation it performs online modeling. Opponent modeling does not always bring the best outcomes. One reason that opponent modeling does not guarantee a better outcome for an agent is that the model can be a poor representation of the opponent's preferences. Yu, Ren & Zhang (2013) proposed a learning agent that use a combination between Bayesian Learning (BL) and regression analysis in order to predict the deadline and the reserve point. They defined a set of hypotheses using the Bayesian Learning and updated those hypotheses based on the distance generated by regression analysis between the hypotheses about the reserve value and historical offers made by the opponent. Learning the opponent model can be computationally expensive and can therefore influence the amount of bids that can be explored. More precisely, the gain in using the model should be higher than the loss in utility due to decreased exploration of the outcome space (time/exploration trade-off, ANAC 2011).

Many efforts have been made to improve the accuracy of the models, which can be evaluated against simple baseline strategies or with the adoption of negotiation platforms. Coehoorn and Jennings (2004) evaluate the performance of their opponent model using a standard bidding strategy that can be used both with and without a model. GENIUS is a negotiation platform focused on bilateral negotiation, which allows to generate better automated negotiators, explore different learning and adaptation strategies and opponent models, and collect state-of-the-art negotiating agents, negotiation domains, and preference profiles. It also enables making them available and accessible for the negotiation research community. GENIUS every year introduces new negotiation agents with better learning techniques to model the opponent. GENIUS showed a lack accuracy for controlling the agents' behavior, where agents may encounter human decision makers whose behavior is diverse. Such diverse behavior cannot be captured by a monolithic model; humans tend to make mistakes because they are affected by cognitive, social, and cultural factors, etc. (Bazerman and Neale 1992; Lax and Sebenius 1992). The negotiation process refers to the events and interactions that occur between parties before the outcome and includes all verbal and non-verbal exchanges among parties, the enactment of bargaining strategies and the external and situational events that influence the negotiation (Katia Sycara and Tinglong Dai in Agent Reasoning in Negotiation).

Most of the research that so far led to the creation of negotiation models is based on theoretical analysis due to the lack of prior data in a consistent quantity. The recent release of Best Offer bargaining dataset made by Ebay (March 2018) as part of the "Bilateral Bargaining through the Lens of Big Data" project opened up to research based on empirical data: "Communication and Bargaining Breakdown: An Empirical Analysis", January 2018 and "Sequential Bargaining in the Field: Evidence from Millions of Online Bargaining Interactions", March 2018. The analysis of this amount of data confirmed the validity of some of the patterns on which were based the theoretical models but showed at the same time their rigidity and the lack of consistency in all the domains.

The present invention addresses these and other problems associated with the prior art in implementing automated negotiation agent with opponent's behavior prediction, comprising:

Implements an adaptive agent able to deal with real world settings without the need of unrealistic and oversimplifying assumptions associated with prior art. Negotiation in non-stationary environments is supported without the need of prior knowledge of the negotiation strategy adopted by the opponent. The significant reduction of agent's state and action spaces, while preserving a high degree of expressiveness and accuracy, provides computational tractability enabling efficient real time automated negotiation.

Online modeling. It is domain-independent as it is not based only on past experience model-learning.

Offline modeling. It is not limited to the learning of an unknown opponent in a single session, but also take advantage of the past experience, when available, by applying knowledge transfer.

It is negotiation driving forces aware and casual-effect aware. It captures and analyzes the signals exchanged between the parties throughout the negotiation to identify the opponent's adopted strategy and model the agent accordingly.

Solves the general intractability of non-Markovian highly dimensional POMDP processes by implementing a special state-action spaces dimensionality reduction by means of vectors encoding and a unique solution to train deep neural network for the generalization of the history representation to practically predict the opponent's behavior in automated negotiations.

Solves the non-stationary learning problem of opponent modelling, where deep reinforcement learning typically performs poorly in such settings, by concurrently and dynamically training inter-dependent deep neural networks associated to each opponent's model and adapted to behavior changes by an ensemble of experts.

BRIEF SUMMARY OF THE INVENTION

Bilateral automated negotiation in which two agents with incomplete information adopt an alternating-offers protocol trying to reach an agreement on a single-issue while maximizing their own utility is the preferred embodiment for this invention. Other possible embodiments include, but are not limited to, multi-issues multilateral automated negotiation with incomplete information among multiple agents. Examples of these embodiments can be obtained by converting multiple issues into a single issue and multiple negotiating threads can implement bilateral negotiation to provide multilateral negotiation among multiple agents.

Automated agents implements multi-strategy abilities suitable for the specific negotiation. Agents improve the performance by learning from the opponent's behavior with the adoption of Machine Learning and Cognitive Computing. Best route for settlement is provided as in the case of turn-by-turn vehicle navigation. The agent makes no assumptions about the internals of its opponent, it focuses only on the signals, that it receives, to build the opponent's psychological and behavioral model. Negotiating best practices, hints and opponent's strategy insights are provided by the agent. Negotiations history and opponents models are stored in private data base. Negotiation efficiency is improved by learning from the negotiations history.

BRIEF DESCRIPTION OF THE DRAWINGS

FIG. 3 "Hypothetical Opponent's Offer Predictor" presents the functional block diagram of the opponent's offer predictor.

DETAILED DESCRIPTION AND BEST MODE OF IMPLEMENTATION

The following discussion is directed to various embodiments of the invention. Unless otherwise specified, the embodiments disclosed should not be interpreted as limiting, or otherwise used to limit, the scope of the disclosure or claims. In addition, one skilled in the art will understand that the following description has broad application. The discussion of any embodiment is meant only to be exemplary of that embodiment and is not intended to suggest that the scope of the disclosure or claims is limited to that embodiment. In this disclosure, numerous specific details may be set forth to provide a sufficient understanding of the embodiment. However, those skilled in the art will appreciate that the invention may be practiced without such specific details. In other instances, well-known elements may have been illustrated in schematic or block diagram form in order not to obscure the disclosure in unnecessary detail. Additionally, some details may have been omitted where such details were not considered necessary to obtain a complete understanding of the embodiment, and are considered to be within the understanding of persons of ordinary skill in the relevant art. Further, all functions described herein may be performed in either hardware or software, or a combination thereof, unless indicated otherwise.

The formal model of the bilateral negotiation is the following: agent and opponent acts as buyer or seller and are denoted with i ($i \in \{b, s\}$) and alternatively at time $t \in T \wedge t < T_{max}$ take actions of the type:

$$A(t) = \begin{cases} \text{offer } X_i(t) \in \mathbb{R} \text{ with } X_i(t) > X_i(t-1) \text{ if } i = \text{buyer or } X_i(t) < X_i(t-1) \text{ if } i = \text{seller}; & [\text{eq. 1}] \\ \text{accept } X_i(t) \in \mathbb{R}; & ; \\ \text{quit with no agreement} \end{cases}$$

The goal of the agent and the opponent is to maximize the utility function:

$$U_b(t) = \frac{MAX_b - X_b(t)}{MAX_b - MIN_b} \qquad [\text{eq. 2a}]$$

where $U_b$ is the utility of the buyer at the negotiation round t, MAX is the maximum amount that the buyer is willing to pay, MIN is the amount corresponding to the opening offer. The utility of the seller is given by:

$$U_s(t) = \frac{X_s(t) - MIN_s}{MAX_s - MIN_s} \qquad [\text{eq. 2b}]$$

The range of possible offers $X_i(t)$ that the parties can agree on is the zone of possible agreement (ZOPA) or the bargaining zone if $MAX_b > MIN_s$. $MAX_b$ and $MIN_s$ are named the Reservation Points (RP). The deadline $T_{max}$ corresponds to the negotiation rounds after which one of the party does not find any advantage in seeking for a settlement. An agreement is found when $X_b(t+1) >= X_s(t)$ or $X_s(t+1) <= X_b(t)$ per $t <= T_{max}$.

Figure 1:
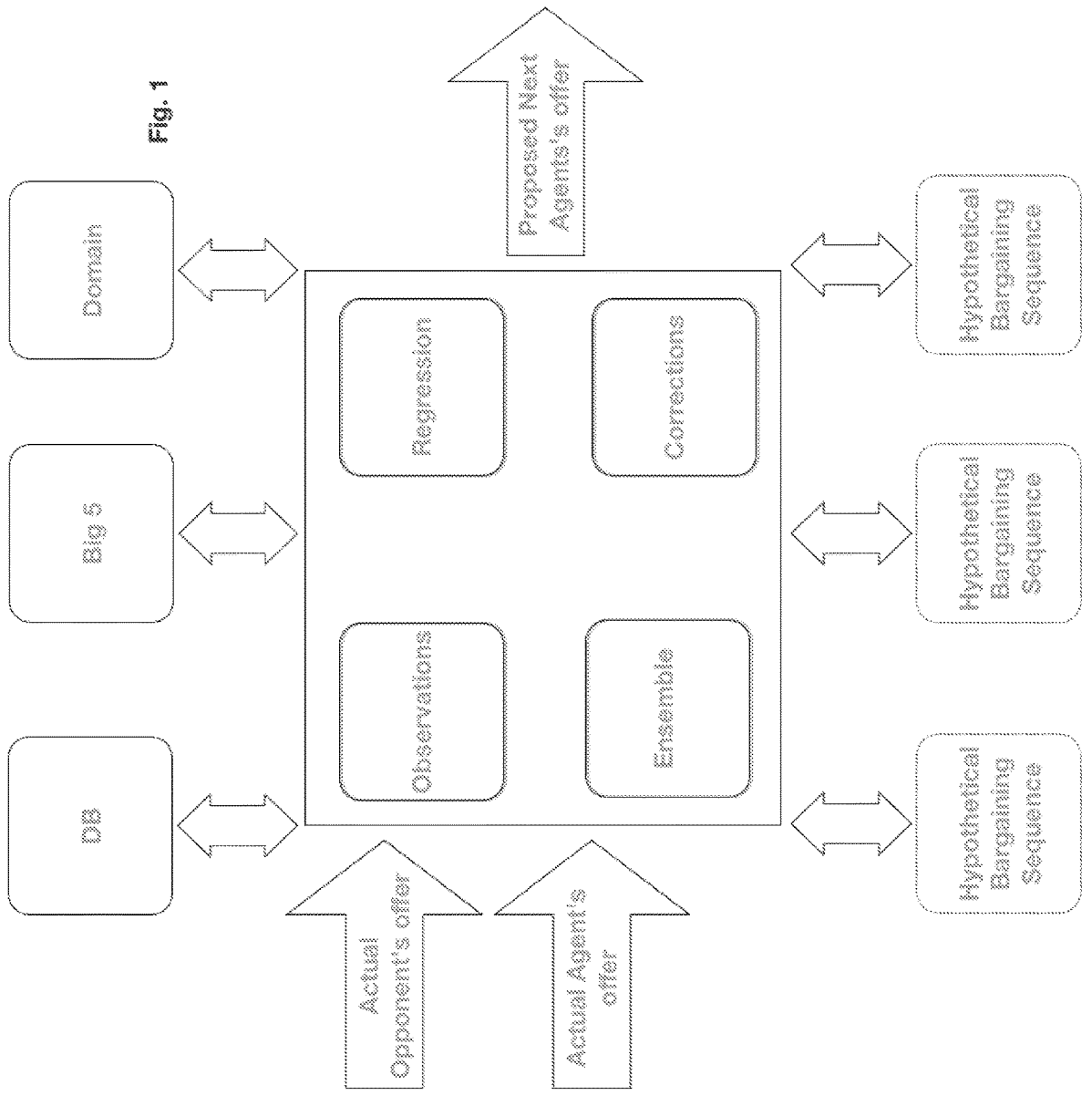
FIG. 1 "Offer Profiler" shows the functional block diagram of the automated agent's system overview.

The agent is implemented as a Offer Profiler (FIG. 1), it receives the Agent's and Opponent's actual offers as input and outputs the Agent's recommended offer as part of a offers trajectory leading to a settlement with the best utility.

The mathematical model is a 8-tuples <RAO, ROO, H, CO, D, O, HBS, PAO> where:

RAO are the actual offers made by the agent satisfying the properties defined by eq. 1.

ROO are the actual offers made by the opponent satisfying the properties defined by eq. 1.

H is the set of historical offers and counter offers which are sequences of the type $\{X_s(t_0), X_b(t_0), X_s(t_1), X_b(t_1), X_s(t_2), X_b(t_2) \dots \}$ with $X_i(t) \in R$ and $i \in \{b, s\}$.

CO is a tuple of variables and functions denoting the Cognitive Orientation of the opponent.

D is the set of the information related to the domain. These are the negotiation setup information: opponent's profile, opponent's guessed RP and agent's RP, opening offers and historical negotiation data.

O is a set of functions having as variables the offers of the current negotiation. This functions compose the Observer module. It captures insights and signals from the negotiation's offers sequence. It tries to fill the gap of the bargaining with incomplete information, by revealing some aspect critical to reaching agreement, such as the opponent's Reservation Point. Learning the possible range of the opponent's private information allows to alter the agent's concession strategy adaptively, as a result a better negotiation outcome can be achieved.

HBS is the set of the Hypothetical Bargaining Sequences based on different Opponent's Models (OM). The Agent Proposer (AP) module bargains against a specific OM. The generated offers and counter-offers sequence $\{X_{ap}(t_0), X_{om}(t_0), X_{ap}(t_1), X_{om}(t_1), \dots \}$ leads to a settlement that maximizes the agent's utility. Each AP's offer is chosen according to the predicted OM's counter-offer. Agent's utility maximization depends on the accuracy of the OM. The belief on how well the single model represents the opponent is determined by different factors (variables):

$$\theta_{ml} - \underset{\theta}{\operatorname{argmax}} PR(ROO \mid \theta, OM) \qquad [\text{eq. 3}]$$

where ROO are the opponent's real offers, $\theta$ are the parameters associated to the non-linear regression that best approximates the curve through ROO.

$$\theta_{ml} - \underset{\theta}{\operatorname{argmax}} PR(ROO \mid \theta, OM) Pr(\theta, OM) \qquad [\text{eq. 4}]$$

Maximum posterior probability given the prior associated to the CO and opponent's matching profile.

PAO are the set of Proposed Offers which leads to a settlement that maximizes the Agent's utility:

$$U = \underset{x_i(t)}{\operatorname{argmax}} u(t). \qquad [\text{eq. 5}]$$

where $u(t)(t \in T \wedge t < T_{max})$ is the function of the agent's utility of the type specified by eq. 2. The Proposed Offers are the results of ensembles of experts applied to the HBS set. One preferred embodiment consists in linearly combine the HBS into ensemble:

$$\zeta(x, w) = \sum_{j=1}^{n} w_j * x_{ap}(t) \qquad [\text{eq. 6}]$$

where $t \in T \wedge t < T_{max}$ and $w_j$ are the weights associated to each experts $j \in HBS \wedge j < n$. Ensemble weights are dynamically updated on the basis of the proposed offer's current and past performance. The set of parameters w are the ones minimizing the expected mean squared error:

$$\eta \approx \frac{1}{n}\operatorname*{argmin}_{\eta}\sum_{j=1}^{n}((f(x_j, w_j) - r))^2 \qquad \text{[eq. 7]}$$

where Xn are the opponent predicted offers by the expert j and r are the actual offers. The above expresses the minimum difference between the predicted opponent's offers and the opponent's actual ones, where minimum is the lowest value in a list of values.

An innovative approach is applied to the encoding of the offer values and plays a crucial role in the proposed system. Offer sequences are treated as trajectories and as such offers are converted from scalar values into vectors of the type $v=\{\alpha, \mu\}$, which are composed of a direction $\alpha$ and a magnitude $\mu$. The former captures the shift direction of the Midpoint (MP) caused by the offer whereas the latter capture the shift magnitude. The MP assumes a relevant importance during the negotiation. It signals the direction of the possible bargaining settlement. Experienced negotiating parties carefully evaluate the MP prior making an offer. It is computed as following:

$$MP = \frac{X_s(t) - X_b(t)}{2} + X_b(t) \qquad \text{[eq. 8]}$$

Offers can cause MP shifts along between the parties' two initial offers segment $ii=\{X_s(t_0), X_b(t_0)\}$. This shift or one-dimensional motion is similarly represented as in the Qualitative Trajectory Calculus (QTC), where its representation is the description of relative rather than absolute motion. MP shift is relative to the two initial offers ii.

The direction (orientation) $\alpha$ can assume the following values $\{-, 0, +\}$, where "−" represent a rejection of the opponent's offer, "0" represent the acceptance of the opponent's offer, "+" represent a concession as a response to the opponent's offer.

"−" for $X_b(t)=X_b(t-1)+X_s(t-1)-X_s(t)-\varepsilon$

"0" for $X_b(t)=X_b(t-1)+X_s(t-1)-X_s(t)-$

"+" for $X_b(t)=X_b(t-1)+X_s(t-1)-X_s(t)-\delta$ where $\varepsilon \in R \wedge \varepsilon > 0 \wedge \varepsilon < |X_s(t-1)-X_s(t)|$; $\delta \in R \wedge \delta > |X_s(t-1)-X_s(t)| \wedge \delta \leq |X_s(t-1)-X_b(t-1)|$.

The magnitude $\mu$ can assume the following values $\{\varepsilon, 0, \delta\}$. These values are discretized to reduce the vector space. The following minimum discrete values indexes are considered in this embodiment:

defensive (d)
moderate (m)
agressive (a).
with d<m<a.

The indexes d, m and a respectively divide the $\varepsilon$ and $\delta$ segments in $N_d$, $N_m$, $N_a$ intervals with $N_a < N_m \leq N_d$.

These intervals define the number of offer rounds required to shift the midpoint of the segments quantity ($\varepsilon$ or $\delta$). Other discretization methods can be adopted to increase the granularity.

We define the bargaining act from a negotiating party prospective as a stochastic process composed of a set of states S. The single state is identified by $s=\{a, p, co\} \wedge s \in S$.

Where $a \in A$ is represented by the vector $v=\{\alpha, \mu\}$. A is the set of the possible actions performed by the opponent in the form of offers. $co \in CO$ is a discrete value representing the cognitive orientation of the negotiating party. $p \in P$ is a discrete value associated to the position of the MP along the segment delimited by the two initial offers ii. The two initial offers segment ii is discretized to reduce the amount of states. The minimum number of segment divisions that we consider for simplicity in this embodiment is the following: $p=\{a, b, c, d, e, f\} \wedge p \in P$. Assuming that the agent covers the seller role then a identifies the position midpoint (MP)≥opponent's reservation point (ORP).
b identifies the position ORP≥MP≥agent's target (T).
c identifies the position ORP≥MP≈T.
d identifies the position OT≥MP≥agent's reservation point RP.
e identifies the position OT≥MP≈RP.
f identifies the position MP≤RP.

Positioning is symmetrical if the agent is the buyer.

Target T identifies the settlement value considered optimal by the negotiating party (T≥RP for the seller and T≤RP for the buyer). Other embodiments adopts discretization methods to obtain more intervals and increase the granularity.

Figure 4:
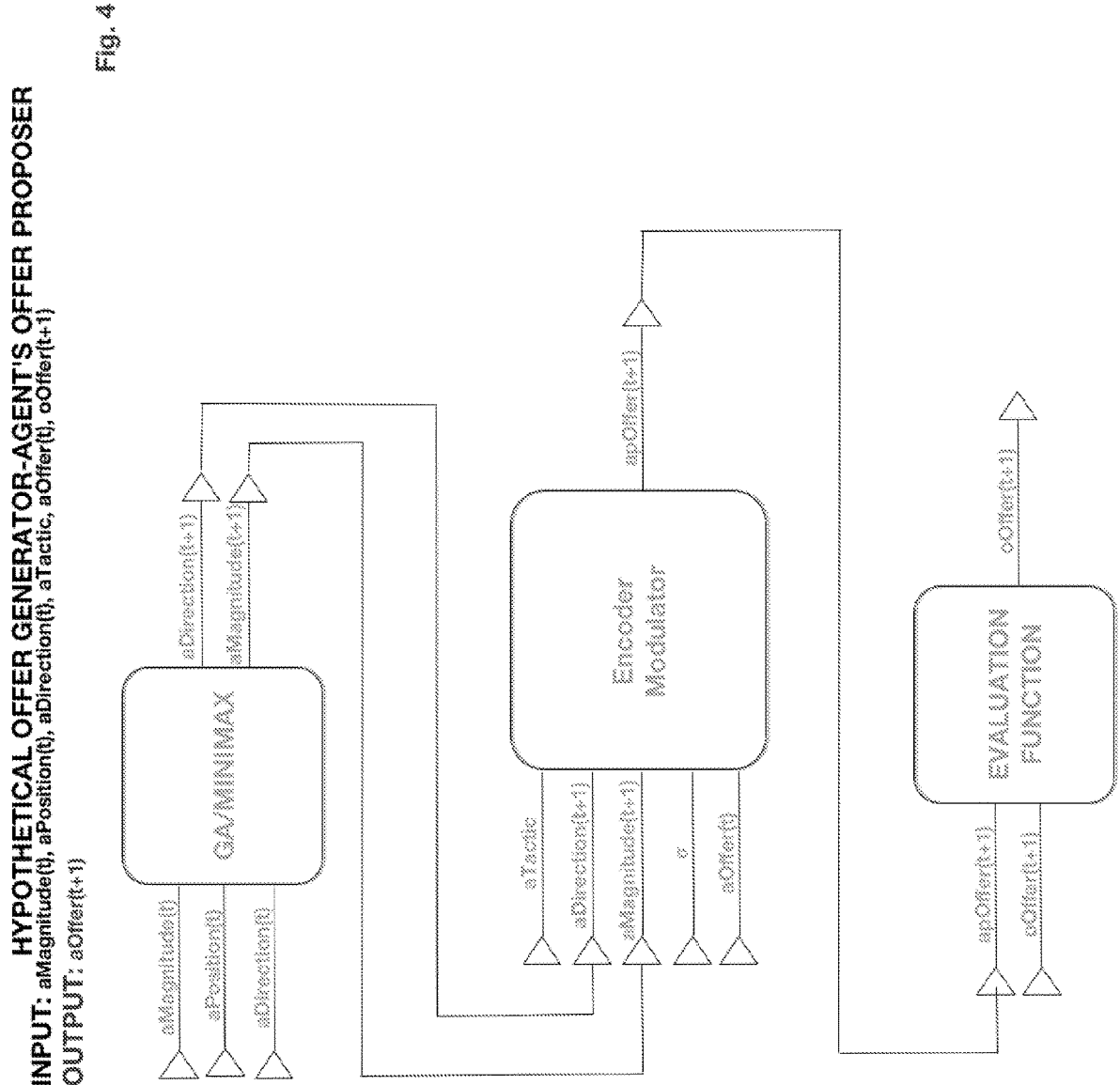
FIG. 4 "Hypothetical Agent's Offer Proposer" presents the functional block diagram of the agent's offer proposer.

A tactic is the decision policy for choosing actions in different situations, instead tactic is used in this embodiment to determine the magnitude $\mu$ of the vector v. The tactic variable assumes different discrete values indexing the adopted tactic type. The Encoder/Modulator module (FIG. 4) converts the vector $v=\{\alpha, \mu\}$ into a scalar offer according to the tactic variable $\tau_i \in T$. Some of the tactic types $\tau_i$ follows below:

Faratin's time dependent family of tactics. These are tactic families where time is the predominant factor. Offers are generated with the objective of reaching a given offer amount (Stop Offer) within a given maximum time (Stop Time).

The rate at which the SO is reached is parametrized by a value $\beta \in \mathbb{R}$ +. There are three types of tactic in this family: Boulware ($\beta<1$), Linear ($\beta<=1$), Conceder ($\beta>1$) where $\beta$ is the concession parameter:

$$\begin{cases} MIN^i + \alpha^i(t)(MAX^i - MIN^i) & \text{if } i = \text{buyer}; \\ MIN^i + (1 - a^i(t))(MAX^i - MIN^i) & \text{if } i = \text{seller} \end{cases} \qquad \text{[eq. 9]}$$

where $0 \leq \alpha^i \leq 1$, and can assume one of these forms:
Polinomial:

$$\alpha^i(t) = k^i + (1 - k^i)\left(\frac{\min(t, t^i_{max})}{t^i_{max}}\right)^{\frac{1}{\beta}} \qquad \text{[eq. 10a]}$$

Exponential:

$$\alpha^i(t) = e^{\left(1 - \frac{\min(t, t^i_{max})}{t^i_{max}}\right)^\beta * \ln k^i} \qquad \text{[eq. 10b]}$$

where $k^i \in [0,1]$ determines the initial offer at t=0 in [$min^i$, $max^i$].

Resource-dependent family of tactics. Offers are generated according to the consumption of the resource. Offers become progressively more conciliatory as the quantity of resource decreases:

$$\alpha^i(t)=K^i+(1-k^i)*e^{-resource^i(t)} \qquad \text{[eq. 11]}$$

where $$resource^i(t) = \frac{\mu^i}{|X_{b\leftrightarrow s}^t|}$$

and $\mu^i$ is the time considered reasonable to be spent on negotiation and $|X_{b\leftrightarrow s}^t|$ is the effort made to keep the negotiation on going (i.e. communication cost).

Behavior-dependent family of tactics. Offers are generated to reproduce in percentage or absolute terms the behavior of the opponent:

Relative Tit-For-Tat:

$$X^{t_{n+1}} = \min\left(\max\left(\frac{X_o^{t_{n-2\delta}}}{X_o^{t_{n-2\delta+2}}}*X^{t_{n-1}}, MIN^i\right), MAX^i\right) \qquad \text{[eq. 12a]}$$

It is reproduced in percentage terms the opponent's offers $X_o$ made in the previous $\delta \geq 1$ rounds.

Random Absolute Tit-For-Tat:

$$X^{t_{n+1}} = \min \qquad \text{[eq. 12b]}$$

$$\left(\max\left(X^{t_{n-1}} + \left(X_o^{t_{n-2\delta}} - X_o^{t_{n-2\delta+2}}\right) + (-1)^v R(M), MIN^i\right), MAX^i\right)$$

where R(M) is the function that generates a random value in the interval [0,M] and v=0 for the buyer and v=1 for the seller.

Average Tit-For-Tat:

$$X^{t_{n+1}} = \min\left(\max\left(\frac{X_o^{t_{n-2\gamma}}}{X_o^{t_n}}*X^{t_{n-1}}, MIN^i\right), MAX^i\right) \qquad \text{[eq. 12c]}$$

It is applied the average of the percentage change in a window of $\gamma \geq 1$ of the opponent's history.

Hybrid family of tactics. These tactics are a combination of the above ones, with parameter values determining the weight with which the single tactic impacts on the final offer value.

We define the Opponent Model (OM) as <S, A, T, PR>.

The Opponent Model consists of internal states S, acts on the external environment through actions A (offers made to the agent), implements tactics T which aim to maximize the utility function according to its preferences PR: RP and $T_{max}$ (FIG. 3).

The Opponent Model is a Markov Decision Process (MDP). However, since opponent's states are partially observable due to the unknown opponent's preferences then the opponent would be more properly modeled as a Partially Observable MDP (POMDP). The state's variable P (MP position relative to RP) is unknown because the opponent's RP is only stochastically inferred after every actual opponent's offer. Also CO is a stochastically inferred.

Although the underlying dynamics of the POMDP are still Markovian, where the future state depends only on the current state and action performed, since the current state is not certain, decisions require keeping track of possibly the entire history of the process, making this a non-Markovian process. However by maintaining a probability distribution over all of the states provides as much information as the entire action-observation history would. Upon certain observations, it is possible to infer the likelihood of the system being in a certain state, called the belief state.

If a belief state is given for time 't', and it is performed an action 'a' and get observation 'z' then it is possible to compute a new belief state for time 't+1' by applying Bayes' Rule and using the model parameters. An overwhelming computational complexity is involved with planning in belief spaces. It is empirically found that the execution of the same action over time does not take to the same state. For instance repeated rejections of the opponent's offer can produce disappointment/regret, which affects the state transition function. For this reason, but also to reduce the complexity of finding policies that approximate the optimal POMDP policy, MDP is adopted as opponent's model with the addition of some heuristics. MDP allows to have value functions in the states space instead of in the space of beliefs as in case of POMDP. One of the heuristic consists in reducing the state space S: state s={a, p, co} is replaced with s={a, p}. CO is removed from from the MDP state space to be used instead for the generation of different opponent's models OM.

The other heuristic consists in updating the state transition function according to the results of the state-action history analysis.

An MDP is a tuple <S, A, PO, R, $\gamma$>, where S is our state space, A is a finite set of actions, PO is the state transition probability function that maps a state and action pair to a probability distribution over S, $$P_a(ss^1)=P\{S(t+1)=s^1|S(t)=s,A(t)=] \qquad \text{[eq. 13]}$$

R is the reward function $R:S\times A\times S \mapsto \mathbb{R}$, $$R_a(s)=E\{R(t+1)|S(t)=s,A(t)=a,S(t+1)=s^1] \qquad \text{eq. [14]}$$

and $\gamma$ is the discount factor $\gamma \in [0,1]$

PO is given in advance by experts as in offline planning but it is continuously updated after every opponent's real offer.

R is an expression of the payoff made associated to the state transition. $R_a(s)$ is the immediate reward gained after taking action a in state s that leads to the state $s^1$. Reward scores $R_a(s)$ {$R_a(s)\in R: -1\leq R_a(s)\leq 1$} are assigned according to the best action planning, which is modeled on the tuple R(s, a, $s^1$) expressing the effectiveness of the midpoint shift according to the pair of actions made and received. Higher score is assigned to actions that shift the midpoint toward the opponent's negotiation target at the expense of the agent's utility.

The solution for an MDP is a policy which describes the best action for each state in the MDP. A history starting from state sh$\in$S corresponds to a sequence: ($s_h$, $a_h$, $s_{h-1}$, $a_{h-1}$, . . . , $a_1$, $s_0$) where $\forall i=1, . . . , h$, ($a_i$, $s_{i-1}$)$\in$A$\times$S. A decision rule $\delta$: S$\rightarrow$A is a mapping from states to actions. The set of all decision rules is denoted by $\Delta$. A policy $\pi$ is a sequence of decision rules: $\pi=(\delta_h,\delta_{h-1}, . . . \delta_1)$ where $\forall t=1, . . . ,h, \delta_t\in\Delta$ is the decision rule applied at the $t^{th}$-to-last step. An optimal policy is a policy that is preferred to any other policy. This is the optimal policy t that maximizes the expected discounted reward:

$$V(s) = \sum_{s^1} P_{\pi(s)}(s, s^1)(R_{\pi(s)}(s, s^1) + \gamma V(s^1)) \qquad \text{[eq. 15]}$$

$$\pi(s) = \operatorname{argmax}_a \left\{ \sum_{s^1} P(s^1 \mid s, a)(R(s^1 \mid s, a) + \gamma V(s^1)) \right\} \qquad \text{[eq. 16]}$$

Value Iteration (Bellman equation) is applied to find the best action:

$$V_{i+1}(s) = \max_a \left\{ \sum_{s^1} P_a(s, s^1)(R_a(s, s^1) + \gamma V_i(s^1)) \right\} \qquad \text{[eq. 17]}$$

The decoded offer received from the Agent is fed into the State Analyzer module (FIG. 3), which identifies a corresponding MDP state s∈S. Value Iteration provides the policy $\pi(s)$ determining the best action a that takes OM from state s to state the following one $s^1$. State $s^1$ corresponds to the predicted offer that OM receives from the Agent in response to action a. Direction and magnitude of a together with the active tactic are fed into the Encoder/Modulator module to generate the OM's offer (FIG. 3).

Figure 2:
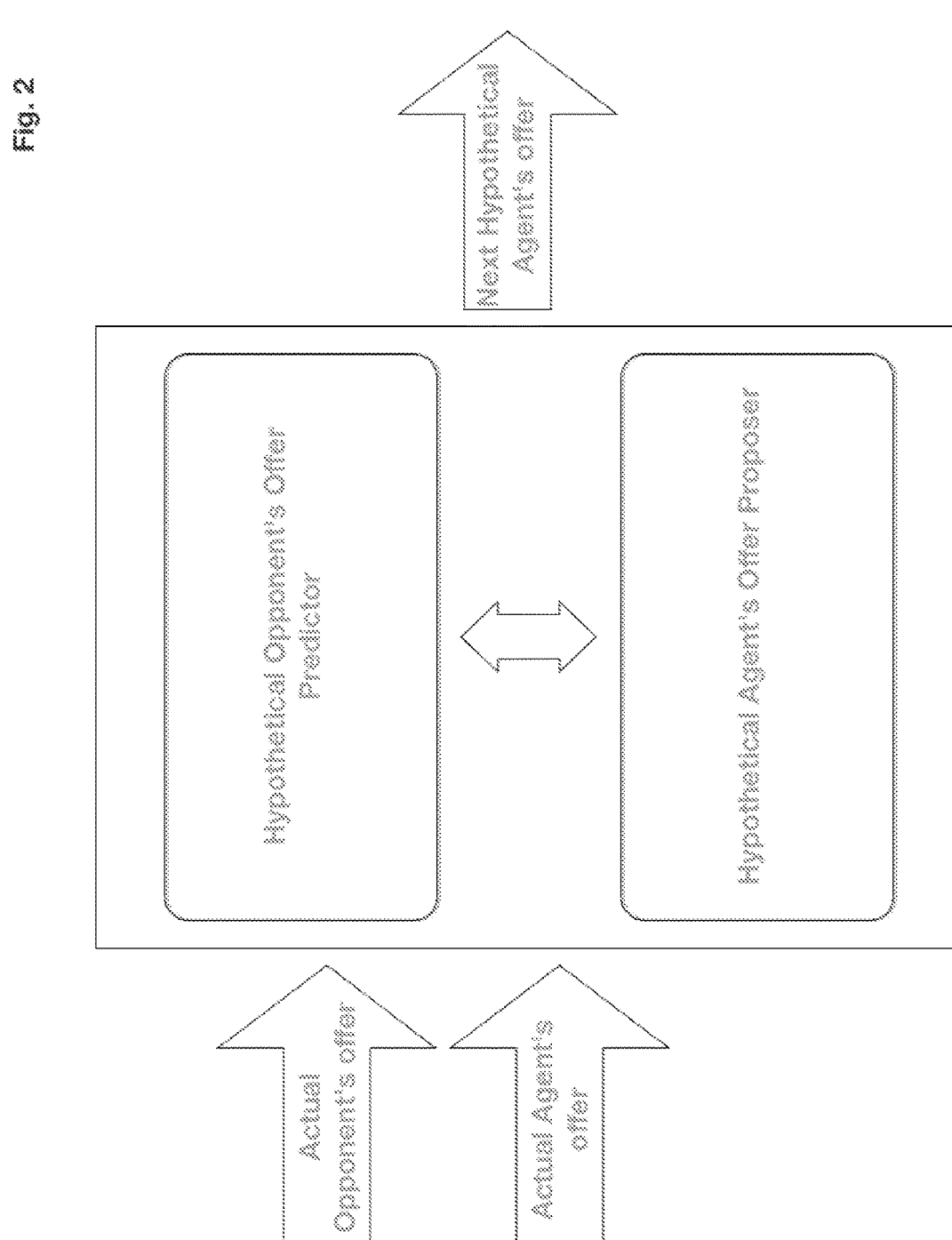
FIG. 2 "Hypothetical Offer Generator" illustrates the two main functional blocks generating the agent's offers: Hypothetical opponent's offer predictor block and the Hypothetical agent's offer proposer.

The Agent at each negotiation round, starting from its and the opponent's last offers, select an offer to be submitted to the Opponent, to which the OM replies with a counter-offer according to its MDP policy $\pi(s)$. The Agent evaluate the payoff obtained and repeats the above steps until one of the parties decides to settle or quit the negotiation. In other words the Agent evaluates different offers by measuring the utility produced through the predicted development of the following rounds (FIG. 2). Two different approach are used for the offers selection to be submitted to the OM: MiniMax (MM) and Genetic Algorithm (GA). MM is an adversarial search algorithm whereas GA is an adaptive heuristic search algorithm premised on the evolutionary ideas of natural selection and genetic. MM is more accurate but more computational expensive therefore it is preferred the application of GA in case of high numbers of negotiation rounds to be predicted.

The classical MM is the following:

$$\text{MiniMax}(s) = \begin{cases} \max_{a \in A} \sum_{s^1 \in S} P(s^1 \mid s, a)\text{MiniMax}(s^1) & \text{if } s \notin \Omega \wedge i(s) = \text{agent}; \\ \min_{a \in A} \sum_{s^1 \in S} P(s^1 \mid s, a)\text{MiniMax}(s^1) & \text{if } s \notin \Omega \wedge i(s) = \text{opponent} \\ \text{utility}(s) & \text{otherwise (terminal state} - \text{leaf)} \end{cases} ;$$

[eq. 18]

where $\Omega \subseteq S$ is the set of terminal states.

It consists of a tree search amongst nodes alternatively divided into min and max until a leaf is found. Each node has a minimax value which is the best achievable utility against a rational adversary. The max and min nodes returns respectively the values maximizing and minimizing the agent's utility.

It is adopted a modified version of the classical minimax to reduce the search tree size. The min nodes are replaced by the opponent's (OM) MDP policy:

$$\text{MiniMax}(s) = \qquad \text{[eq. 19]}$$
$$\begin{cases} \max_{a \in A} \text{MiniMax}(\text{State}(\pi(s))) & \text{if } s \notin \Omega \wedge i(s) = \text{agent}; \\ \text{utility}(s) & \text{otherwise (terminal state} - \text{leaf)} \end{cases} ;$$

where $\Omega \subseteq S$ is the set of terminal states, State is the function that returns the agent's state associated to the opponent's action determined by the MDP policy π for the state s: $s^1 = \text{State}(\pi(s))$. The policy $\pi(s)$ is computed only once before starting the tree search and updated after every Opponent's real offer.

The best agent's action is given by:

$$E(s) = \operatorname*{argmax}_{a \in A(s)} \text{MiniMax}(s) \qquad \text{[eq. 20]}$$

A basic Genetic Algorithm is the following:
[Start] Generate random population of n chromosomes.
[Fitness] Evaluate the fitness f(x) of each chromosome x in the population.
[New population] Create a new population by repeating following steps until the new population is complete.
    [Selection] Select two parent chromosomes from a population according to their fitness (the better fitness, the bigger chance to be selected).
    [Crossover] With a crossover probability cross over the parents to form a new offspring (children). If no crossover was performed, offspring is an exact copy of parents.
    [Mutation] With a mutation probability mutate new offspring at each locus (position in chromosome).
    [Accepting] Place new offspring in a new population.
[Replace] Use new generated population for a further run of algorithm.
[Test] If the end condition is satisfied, stop, and return the best solution in current population.
[Loop] Go to step 2.

The action vectors $v = \{\alpha, \mu\}$ are codified into an integer, which bits sequence compose the genes structure. The chromosome is a sequence of genes with the length corresponding to the maximum estimated rounds number. In other words the chromosome is a sequence of agent's offers (genes) which are selected through the mechanism of evolution. A fitness function evaluate how close a given solution is to the optimum solution. The optimum action is chosen by computing a fitness function function on genetically evolved actions sequence played against a greedy MDP's reaction sequence of the OM. The actions and counter action vectors are evaluated after their conversion into scalar offers by means of the Encoder/Modulator module.

One possible embodiment of the fitness function δ is the following:

δ(t)=(φ(t)+ρ(t))*τ; where τ is the time discount factor {τ∈R: 0≤τ≤1} and φ is the Settlement score:

$$\varphi(t) = \frac{(X_s(t_0) - X_b(t_0)) - (X_s(t) - X_b(t))}{X_s(t_0) - X_b(t_0)} \qquad \text{[eq. 21]}$$

with $\varphi \in R$: $0 \leq \varphi \leq 1$.

Smaller is the difference between the demand and offer higher is the Settlement score. $\rho$ is the Utility score in case the agent is the seller:

$$\rho(t) = \frac{X_s(t) - RP_s}{X_s(t_0) - RP_s} - \frac{RP_b - X_b(t)}{RP_b - X_b(t_0)} \qquad \text{[eq. 22a]}$$

with $\rho \in R$: $-1 \leq \rho < 1$.

The Utility score is higher as bigger is the difference |midpoint−RP|.

The following is the Utility score in case the agent is buyer:

$$\rho(t) = \frac{RP_b - X_b(t)}{RP_b - X_b(t_0)} - \frac{X_s(t) - RP_s}{X_s(t_0) - RP_s} \qquad \text{[eq. 22b]}$$

The opponent's RP is the one estimated by the Observer.

Figure 5:
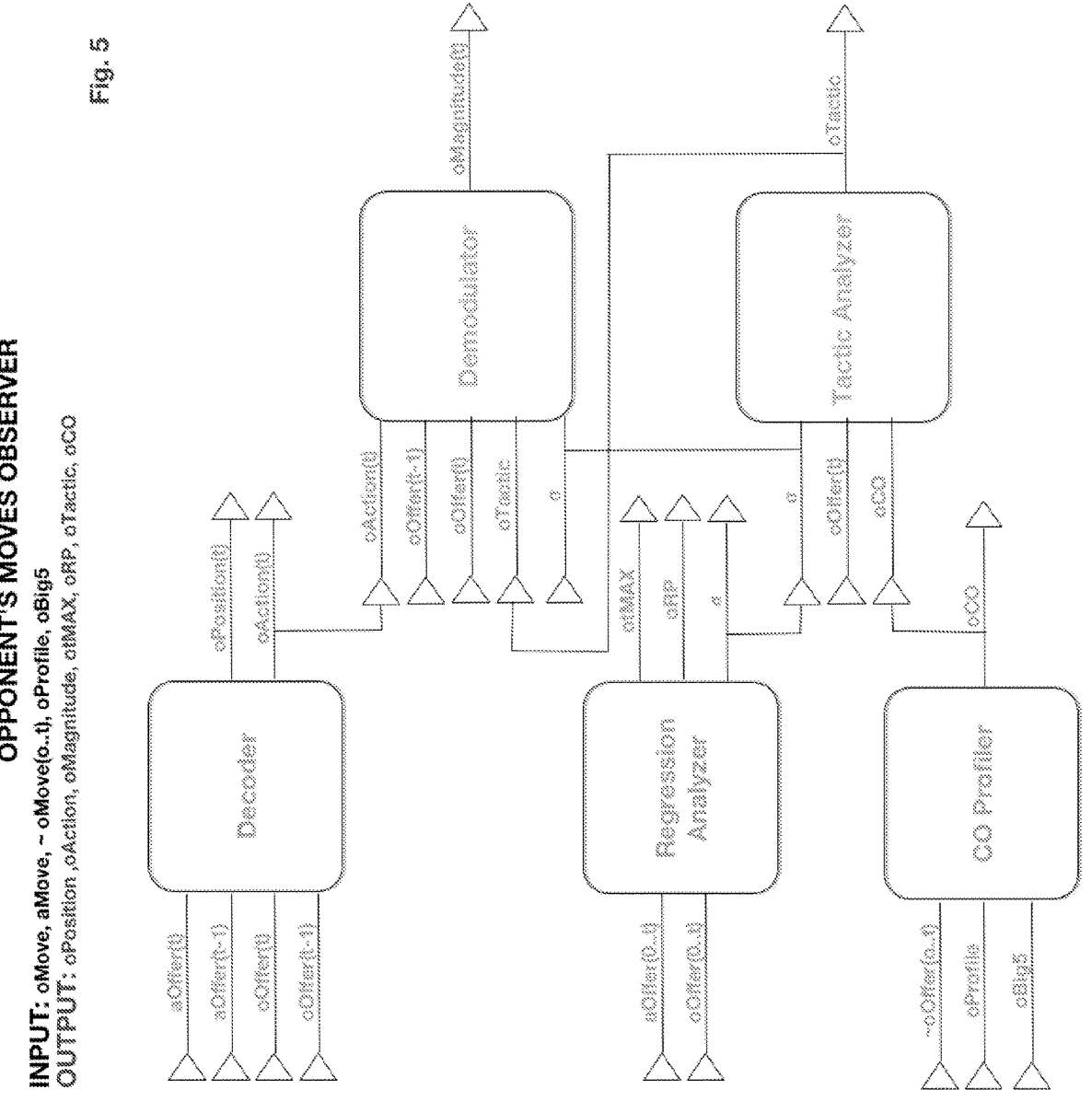
FIG. 5 "Observer" presents the functional block diagram of the observer module.

The Opponent Model continuously learn from the opponent's real behavior. The Observer module (FIG. 5) analyzes the opponent's real offers to provide negotiation insights in terms of parameters and variables needed to dynamically adjust the OM during the negotiation process according to the learned opponent's tactics. Tactics $\tau_i \in T$ are decision functions which can be represented by the non linear function f: $x(t) = f(\theta_0, \theta_1, \ldots \theta_n, t) + e(t)$ where $\theta_j$ ($j \in 0 \ldots n$) are the same function parameters (ii, ORP, $T_{max}$, $\beta$, tactic) feeding the Encoder/Modulator module. $e(t)$ is the residual between real offer $x(t)$ from the opponent and the opponent's offer calculated with $\sim\theta_j$, which are the estimates of parameters $\theta_j$. Learning the opponent's tactic requires the research the of the fitting curve minimizing $e(t)$, which is a non-linear least square (NLSR) regression. While there are several methods to find the parameter estimates for the NLSR (Steepest descent, Gauss-Newton, Newton, Marquardt, Extended Kalman Filter) this embodiment adopts a total different approach. It adopts Bayesian Learning (BL) to discover the opponent's preferences. It is preferred to use the probability distribution instead of single points estimates. Ordinary NLSR provides a single point estimate for the output, which can be interpreted as the most likely estimate given the data. However, in case of small dataset it's more convenient to express the estimate as a distribution of possible values. In addition if a prior probability distribution is known at the beginning of the negotiation process it can be exploited with Bayesian Learning.

BL approach. The Observer module has a belief about the probability distribution of the opponent's negotiation parameters (i.e. the deadline and reservation offer). By observing opponent's historical offers and comparing them with the fitted offers derived from a regression analysis, the Observer can revise its belief using the Bayesian updating rule. A set of hypothesis $H = \{H_1, H_2, \ldots, H_n\}$ stands for the assumption that opponent's reservation point (ORP) and negotiation deadline ($T_{max}$) assume respectively $Y = \{\{y_1 z_1\}, \{y_2, z_2\}, \ldots, \{y_n, z_n\}\}$ values. The prior probability distribution, denoted by $P(H_i)$, ($i \in 1, 2, 3 \ldots n$), signifies the belief about the hypothesis that is, how likely the hypothesis fits the real situation. At first, the probability distribution of the hypotheses can be initialized based on some historical information if available, otherwise a uniform distribution $P(H_i) = 1/N$ is assigned. During each round of negotiation, the probability of each hypothesis can be altered by the Bayesian updating rule:

$$P(H_i \mid O) = \frac{P(H_i)P(O \mid H_i)}{\sum_{k=1}^{n} P(O \mid H_k)P(H_k)} \qquad \text{[eq. 23]}$$

where the conditional probability $P(O|H_i)$ represents the likelihood that outcome O might happen based on hypothesis $H_i$. The observed outcome O is the opponent's historical offers $O(t) = \{x(t_0), x(t_1), \ldots, x(t_n)\}$. The conditional probability $P(O|H_i)$ thereby means how likely the historical offer $O(t)$ can happen based on the hypothesis Hi that opponent's real reservation point assume the Yi value. The posterior probability $P(H_i|O)$ is a renewed belief based on the observed outcome O and at next round, the prior probability $P(H_i)$ will be updated using the posterior probability $P(H_i/O)$, thus a more precise estimation is achieved.

The conditional probability $P(O|H_i)$ is obtained by comparing the fitted points $\hat{O}(t)$ on the regression line based on each reservation point $X_i$ with the historical offers $O(t)$. The more consistent the fitted offers are with opponent's historical offers, the higher the conditional probability $P(O|H_i)$ will be. The procedure consists in creating a chart where the y-axis represents the opponent's offers $O_n = \{p_0, p_1, \ldots, p_n\}$ and the x-axis represent the rounds number. Selected chart areas, hereinafter named Searched Areas (SA), are divided into cells forming a matrix. Each cell is associated to the hypothesis that the opponent's reservation point and negotiation deadline fall in it. At round $t_b$ a random reservation point $X_i(t_i^x, p_i^x)$ is selected for each cell.

Assuming that the opponent applies a time-dependent tactic, the following power regression function is generated to calculate the regression curve passing from the previously selected points Xi:

$$X(t) = p_0 + (p_i^x - p_0) * \left(\frac{t}{t_i^x}\right)^b$$

The regression coefficient b is the concession parameter $\beta$ in the time dependent tactics family (refer to eq. 10a):

$$b = \frac{\sum_{i=1}^{tb} t_i^* p_i^*}{\sum_{i=1}^{tb} t_i^{*2}}$$

where $$p_i^* = \ln\frac{p_0 - p_i}{p_0 - p_i^x},$$

$$t^* = \ln\frac{t}{t_i^x}$$

The coefficient of nonlinear correlation $\gamma$ can be calculated by:

$$\gamma = \frac{\sum_{i=1}^{t_b}(p_i - \overline{p})(\widehat{p_i} - \overline{\widehat{p}})}{\sqrt{\sum_{i=1}^{t_b}(p_i - \overline{p})^2 \sum_{i=1}^{n}(\widehat{p_i} - \overline{\widehat{p}})^2}} \qquad \text{[eq. 24]}$$

where $\widehat{p}$ is the average value of all the fitted offers till time $t_b$, and $\overline{p}$ represents the average value of all the historical offers. The non-linear correlation $\gamma$, where $(0 \le \gamma \le 1)$, is a parameter reflecting the non-linear similarity between the fitted offers $\widetilde{O}(t)$ and the historical offers $O(t)$, which can be used as a criterion to evaluate the resemblance between the random reservation point $X_i$ and seller's real reservation point $X$. The value of the non-linear correlation $\gamma$ is used for the conditional probability $P(O|H_i)$.

The most probable reservation point and deadline $Xi(ti, pi)$ corresponds to the most probable hypothesis which is given by the maximum a posteriori probability (MAP):

$$H_{map} = \underset{H_i \in H}{\text{argmax}} P(H_i \mid O) \qquad \text{[eq. 25]}$$

The above described BL process can be synthesize with the following equation:

$$H_{xi} = f(P(H_i), \gamma) \qquad \text{[eq. 26]}$$

The most probable hypothesis, given the priors and non-linear correlation values, is the maximum a posteriori hypothesis.

In general the opponent may change the adopted tactic during the negotiation, therefore multiple SA and different type of regression curves may be required. It is chosen to repeat the application of the Bayesian Learning for every significative combinations of SA and tactic types, thus providing multiple maximum a posteriori probability (MAP). Each of these MAP is associated to the hypothesis that the opponent's reservation point and negotiation deadline falls in one of the cells of different combinations SA and tactic. A second layer of Bayesian Learning is added with MAP as likelihood values whereas prior are determined in accordance to heuristics and historical data:

$$P^1(O \mid H_i) = H_{xi} \qquad \text{[eq. 27]}$$

$$P^1(H_i \mid O) = \frac{P^1(H_i)P^1(O \mid H_i)}{\sum_{k=1}^{n} P^1(O \mid H_k)P^1(H_k)}$$

$$H^1_{map} = \underset{H_i \in H}{\text{argmax}} P^1(H_i \mid O)$$

The overall described BL process can be synthesize with the following equation:

$$H^1_{xi} = g(H_{xi}, SA_i, \tau_i) \qquad \text{[eq. 28]}$$

where $H_{xi}^1$ are the priors, $SA_i$ are the Searched Areas, $\tau_i \in T$ are the tactics.

Significant SA and tactics are chosen according to a set of signals $\Psi$ captured during the negotiation.

Signals are revealed by specific offers or offer sequences (H). A set of equations G, which comprises hand crafted equations and Recurring Neural Network (RNN) algorithms, computes the signals $\Psi = G(H)$.

SA are provided by applying rule-based methods for the $\Psi$ analysis.

The tactic variable $\tau_i \in T$ is the result of the following equation:

$$\tau_i = f(\Psi, CO) \qquad \text{[eq. 29]}$$

where the cognitive orientation of the opponent is provided by the CO module analyzing the parties's profiles, communications and exchanged documents.

For example a particular offers sequence could signal the opponent's disappointment or regret, which combined with the cognitive orientation status may trigger a tactic change.

The CO module is out of the scope of this invention and therefore is treated as a black box.

The co value is also used to select the OM's MDP state transition matrixes. The number of these matrixes corresponds to the range of the possible values of CO. The selection of the single matrix $m_i$ is given by the following equation:

$$m_i = \underset{co}{\text{argmax}} P(co_i) \qquad \text{[eq. 30]}$$

where P defines the probability distribution of the cognitive orientation. Different $m_i$ values select the matrixes corresponding to the cognitive orientation with the highest probabilities. An OM is created for every state transition matrix selection $m_i$. An HBS predictor model [FIG. 2] is created for every OM.

The ensemble unifies the HBS of all the predictor models' $\{m_1, m_2, \ldots, m_n\}$ into one single prediction with the application of the Ensemble Weighted Average:

$$X^1(t) = W_{m_1} * X^1_{m_1}(t) + W_{m_2} * X^1_{m_2}(t) + \ldots + W_{m_n} * X^1_{m_n}(t) \qquad \text{[eq. 31]}$$

where $X_{m_{j[1 \ldots n]}}^1(t)$ are the predictions of the models $m_{j[1 \ldots n]}$ and $W_{m_{j[1 \ldots n]}}$ are the m/[1 ... n] weights associated to the models. The weight is assigned according to the belief of how well the single model represents the opponent. This is expressed as the minimum difference between the opponent model's profile and behaviors and the opponent's ones, where minimum is the lowest value in a list of values.

The model weight is computed using the Bayesian rule:

$$P(M_j \mid ROO) = \frac{P(CO_j)P(ROO \mid M_j)}{\sum_{k=1}^{n} P(ROO \mid M_k)P(CO_k)} \qquad \text{[eq. 32]}$$

where the probability distribution of the cognitive orientation $P(CO_k)$ are the priors. The likelihood $P(ROO|M_k)$ expresses the regression goodness of fit on the real opponent's offers $ROO = \{x(t_0), x(t_1), \ldots, x(t_n)\}$ given by the coefficient of nonlinear correlation $\gamma$. In addition to the regression the likelihood express how well the model's predicted action sequence ($\{aa(t_0), ao(t_0), aa(t_1), ao(t_1), \ldots, aa(t_n), ao(t_n)\}$, aa agent action and ao opponent action $\in A$) matches the real ones. This is represented as the minimum difference between the predicted offers sequence and the actual one, where minimum is the lowest value in a list of values.

The longest common subsequence of sequences (LCS) is computed for all the models MK as well as the similarity measure S:

$$sim(HBS_{k[1 \ldots n]}, ROO) = \frac{LCS(HBS_{k[1 \ldots n]}, ROO)}{|HBS_{k[1 \ldots n]}|} \qquad [\text{eq. 33}]$$

The similarity measure here represents the probability that model $M_k$'s prediction matches the real one. sim is combined with $\gamma$ to compose the likelihood. The conflation of the probabilities is adopted for this combination, that is, sim and $\gamma$ are multiplied together and then renormalized:

$$P(ROO \mid M_k) = \frac{sim(HBS_{k[1 \ldots n]}, ROO) * \gamma_k}{\begin{array}{c} sim(HBS_{k[1 \ldots n]}, ROO) * \gamma_k + \\ (1 - sim(HBS_{k[1 \ldots n]}, ROO)) * (1 - \gamma_k) \end{array}}$$

In conclusion the weight is the posterior probability: $W_{m_i} = P(M_j | ROO)$.

The Bayesian rule computation is restarted from the first offer of ROO at every new given prior $P(CO_k)$.

The probability distribution of the cognitive orientation determines also tactics $\tau_i$ and tactic specific parameters:

$$\tau_i = f\left(\underset{co}{\arg\max} P(co_i)\right) \qquad [\text{eq. 34}]$$

$$\beta = g\left(\underset{co}{\arg\max} P(co_i), \tau_i\right) \qquad [\text{eq. 35}]$$

$\beta$ is the parameter of the Faratin's time dependent family of tactics. Others parameters associated to different tactics are computed in the same way.

The MDP state transition probabilities define how likely the opponent in the state Si makes an action Aj which takes the opponent to the new state S'i. The state and action pair probability is composed of two different probabilities: one associated to a Markovian process and the other associated to a non-Markovian one. The latter, probability, named Pseq, depends on the state-action sequence, whereas the first one, named Pinf, depends only from the current state and it comes from expert knowledge and state transition frequency measured from historical data. These probabilities are combined together using linear pool or other probabilities aggregating methods:

$$P(A_j) = agg(\text{Pinf}(A_j), Pseq(A_j)) \qquad [\text{eq. 36}]$$

The OM model learns from the opponent's real offers ROO by updating the MDP state transition probabilities (Pinf) with the actual action occurrence. The action event is converted into probability Pfreq of value 1. It is assigned to the current state Si, associated to all the models Mk selected by in proportion to the probability measure that model $M_j$'s prediction matches the real one:

$$\text{Pinf}(E_j | A_j) = \text{Pfreq} * P_{m_k}(A_j) \qquad [\text{eq. 37}]$$

Bayesian inference is adopted to compute the posterior probability associated to the action $A_j$ given the evidence $\text{Pinf}(E_j | A_j)$ and the prior $\text{Pinf}(A_j)$:

$$\text{Pinf}(A_j | E_j) = \frac{\text{Pinf}(E_j | A_j)\text{Pinf}(A_j)}{\sum_{k=1}^{n} \text{Pinf}(E_j | A_j)\text{Pinf}(A_j)} \qquad [\text{eq. 38}]$$

where the occurrence $E_j$ of the action $A_j$ is the likelihood.

The association between Pinf and the MDP state s={a, p} is corrected offline to account for the possible difference between the opponent's RP online estimation and the one acquired offline at the end of the negotiation.

The opponent's RP acquired at the end of the negotiation is the upper bound for the seller and the lower bound for the buyer of the set of all the possible real RPs.

This embodiment, in addition to the adoption of Recurring Neural Network (RNN) algorithms for the computation of signals $\Psi$, employs LSTM for the computation of Pseq. From a probabilistic perspective, Pseq computation is the task of predicting the next action, ao(t), from previous history of actions {aa(t–1), ao(t–1), aa(t–2), ao(t–2), . . . }. In other words, the main problem is to find:

$$\underset{ao(t)}{\arg\max} p(ao(t) \mid aa(t-1), ao(t-1), aa(t-2), ao(t-2), \ldots, m_i)$$

However, the next action depends also on the cognitive orientation of the OM during the sequence generation.

The LSTM architecture uses memory cells to store relevant information needed to learn long range temporal dependencies in the data. Concretely, at each time step t, the LSTM takes $x_t$, $h_{t-1}$, $c_{t-1}$ and produces $h_t$, $c_t$ via the following calculations:

$$i_t = \sigma(W^i x_t + U^i h_{t-1} + b^i)$$

$$f_t = \sigma(W^f x_t + U^f h_{t-1} + b^f)$$

$$o_t = \sigma(W^o x_t + U^o h_{t-1} + b^o)$$

$$g_t = \tan h(W^g x_t + U^g h_{t-1} + b^g)$$

$$c_t = f_t \odot c_{t-1} + i_t \odot g_t$$

$$h_t = o_t \odot \tan h(c_t)$$

where $i_t$, $f_t$, $o_t$ are the input, forget, and output gates.

LSTM training data consists of the action sequence history of the past negotiations. LSTM is fed with the sequence of discrete values corresponding to action vectors $v = \{\alpha, \mu\}$ summed to the associated cognitive orientation mi with the objective of obtaining distinct groups of curves per single $m_i$ value. LSTM is replaced with Compact Prediction Tree (CPT) to avoid costly training process when new sequences are encountered frequently. CPT is out of the scope of this invention and therefore is treated as a black box.

In another embodiment the MDP state transition probabilities map is created and updated by means of Meta-RL. The meta-learning model is a recurrent network with LSTM cell. LSTM internalizes the action-state transaction history to compute the probabilities P(s, a, s').

This embodiment adopts another heuristic to compensate the approximated computation of the expected MDP rewards due to the opponent's preferences uncertainty. A measurement of Efficiency is computed for every action a returned by the policy $\pi(s)$. It avoids the repetition of actions that could stall the MDP process. If the action a returned by the value iteration for the state s is the same as the last one made $\pi(s(t))=t(s(t-1))$ and it had a negative measurement of Efficiency then the new action is selected using the roulette wheel selection method:

$$Par=\Sigma Pa_{i[1 \ldots n]}{}^{*}r \qquad \text{[eq. 39]}$$

where $r$ is a random generated number, $r\in(0,1)$. The new action $a_j$ is indexed by the j value, which is given when the following becomes true $\Sigma Pa_{i[1 \ldots n]}>Par$.

In other words, the new action is randomly provided but according to the actions probability distribution of the state $s\in S$. Efficiency is computed by comparing the midpoint advancement with its expected position according to the offers distance and the remaining rounds number:

$$Ef=Expected MP/Actual MP. \qquad \text{[eq. 40]}$$

Curve regression is also applied to the agent's and opponent's offers history. The intersection between the two curves fitting provides an estimation of the settlement point.

The above-described techniques may be implemented in software, for example as code running on a digital signal processor (DSP) or parallelized across multiple processors, for example GPUs (graphics processing units), or on a general-purpose computer system. Alternatively, the above-described techniques may be implemented in hardware, for example as electronic circuitry, say on an ASIC (application specific integrated circuit); or a combination of hardware and software may be employed, say on neuromorphic computing system.

What is claimed is:

1. A processor-implemented method for training deep neural networks used to predict actions to be performed by an opponent agent in an automated negotiation task, the method comprising:

receiving via a predefined negotiation protocol a request for performing a negotiation task between an agent and an opponent to determine the terms of a predefined transaction; wherein the agent is implemented by the processor;

receiving an agent's and an opponent's previous actual offers via said negotiation protocol; wherein the offers acceptance by the agent and the opponent implies the determination of said terms of the predefined transaction;

sending via said negotiation protocol a next offer that maximizes the agent's utility; wherein said next offer generation comprises:

generating a hypothetical sequence of proposed agent's offers and predicted opponent's counter offers by having every agent of a set of hypothetical agents negotiate with an associated opponent model, round after round until the offers are accepted or the negotiation is terminated; wherein the opponent model is part of a set of opponent models representing the opponent's profile and behaviors;

unifying the hypothetical sequence of the proposed agents' offers into a sequence of said next offers using an ensemble of experts applied to the hypothetical sequence of proposed agents' offers and the associated predicted opponent models' counter offers according to a current and a past performance measurement; wherein the performance measurement comprises:

the minimum difference between the opponent model's profile and behaviors and the opponent's ones, the minimum difference between the predicted opponent's offers and the opponent's actual ones, the minimum difference between the predicted offers sequence and the actual one, the maximum utility value that the proposed agent's offers can achieve;

wherein said hypothetical agent and the associated opponent model negotiation process comprises:

selecting an offer, by the agent, to be submitted to the opponent model, to which the opponent model replies with a counter offer according to a reinforcement learning policy linked to the model; wherein the agent evaluates different offers by measuring the utility produced through the predicted development of the following rounds according to the opponent model's counter offers; wherein the agent's offer selection is determined by the application of adversarial search using the opponent model policy; wherein said opponent model policy maps states to actions; the opponent model is driven into an internal state upon the reception of the agent's offer determined by a reinforcement learning state transition function linked to the model, and reacts with an action according to said model policy;

wherein the single state identification comprises action, position and cognitive orientation;

wherein the action setting comprises:

transforming offers received from the agent into a direction and a magnitude; wherein the direction is associated to a midpoint's shift caused by the offer and counter-offer rounds sequence; wherein the midpoint represents for every round a halfway between the agent' and opponent's offers; wherein the shift represents the midpoint change between rounds; wherein the magnitude is generated by negotiation tactics functions adopted by the agent and the opponent model;

wherein the position setting comprises:

assigning a position value to the midpoint relatively to agent's preferences and opponent's estimated preferences;

wherein the cognitive orientation setting comprises:

assigning a cognitive orientation value to the opponent model according to the opponent's profile and behavior; wherein the cognitive orientation value selects said tactic functions, said state transition function and said policy to be linked to the opponent model;

wherein the opponent's action comprises said direction and said magnitude;

wherein said state transition function maps the agent's action, the position and the cognitive orientation to the opponent model state;

associating a deep neural network with LSTM cells to each opponent model; wherein said deep neural network models the policy and the state transition function of the opponent model;

simultaneously and incrementally training the deep neural networks with LSTM cells by inferring next state-action of the opponent models; wherein the training data are composed by sequence of said transformed state-action; wherein training data are dynamically updated for each model according to the sequence of said next offers generated by the ensemble of experts and the received actual offers transformed into said direction and said magnitude.

2. A system comprising: one or more processing elements; and computer memory storing instructions that, when executed by the one or more processing elements, cause the one or more processing elements to perform a method comprising:

receiving via a predefined negotiation protocol a request for performing a negotiation task between an agent and an opponent to determine the terms of a predefined transaction; wherein the agent is implemented by the system;

receiving an agent's and an opponent's previous actual offers via said negotiation protocol; wherein the offers acceptance by the agent and the opponent implies the determination of said terms of the predefined transaction;

sending via said negotiation protocol a next offer that maximizes the agent's utility; wherein said next offer generation comprises:

generating a hypothetical sequence of proposed agent's offers and predicted opponent's counter offers by having every agent of a set of hypothetical agents negotiate with an associated opponent model, round after round until the offers are accepted or the negotiation is terminated; wherein the opponent model is part of a set of opponent models representing the opponent's profile and behaviors;

unifying the hypothetical sequence of the proposed agents' offers into a sequence of said next offers using an ensemble of experts applied to the hypothetical sequence of proposed agents' offers and the associated predicted opponent models' counter offers according to a current and a past performance measurement; wherein the performance measurement comprises:

the minimum difference between the opponent model's profile and behaviors and the opponent's ones, the minimum difference between the predicted opponent's offers and the opponent's actual ones, the minimum difference between the predicted offers sequence and the actual one, the maximum utility value that the proposed agent's offers can achieve;

wherein said hypothetical agent and the associated opponent model negotiation process comprises:

selecting an offer, by the agent, to be submitted to the opponent model, to which the opponent model replies with a counter offer according to a reinforcement learning policy linked to the model; wherein the agent evaluates different offers by measuring the utility produced through the predicted development of the following rounds according to the opponent model's counter offers; wherein the agent's offer selection is determined by the application of adversarial search using the opponent model policy; wherein said opponent model policy maps states to actions; the opponent model is driven into an internal state upon the reception of the agent's offer determined by a reinforcement learning state transition function linked to the model, and reacts with an action according to said model policy;

wherein the single state identification comprises action, position and cognitive orientation;

wherein the action setting comprises:

transforming offers received from the agent into a direction and a magnitude; wherein the direction is associated to a midpoint's shift caused by the offer and counter-offer rounds sequence; wherein the midpoint represents for every round a halfway between the agent' and opponent's offers; wherein the shift represents the midpoint change between rounds; wherein the magnitude is generated by negotiation tactics functions adopted by the agent and the opponent model;

wherein the position setting comprises:

assigning a position value to the midpoint relatively to agent's preferences and opponent's estimated preferences;

wherein the cognitive orientation setting comprises:

assigning a cognitive orientation value to the opponent model according to the opponent's profile and behavior; wherein the cognitive orientation value selects said tactic functions, said state transition function and said policy to be linked to the opponent model;

wherein the opponent's action comprises said direction and said magnitude;

wherein said state transition function maps the agent's action, the position and the cognitive orientation to the opponent model state;

associating a deep neural network with LSTM cells to each opponent model; wherein said deep neural network models the policy and the state transition function of the opponent model;

simultaneously and incrementally training the deep neural networks with LSTM cells by inferring next state-action of the opponent models; wherein the training data are composed by sequence of said transformed state-action; wherein training data are dynamically updated for each model according to the sequence of said next offers generated by the ensemble of experts and the received actual offers transformed into said direction and said magnitude.

3. A system comprising: one or more processing elements; one or more neural network learning electronic elements; and computer memory storing instructions that, when executed by the one or more processing elements in combination with the one or more neural network learning electronic elements, cause the one or more processing elements to perform a method comprising:

receiving via a predefined negotiation protocol a request for performing a negotiation task between an agent and an opponent to determine the terms of a predefined transaction; wherein the agent is implemented by the system;

receiving an agent's and an opponent's previous actual offers via said negotiation protocol; wherein the offers acceptance by the agent and the opponent implies the determination of said terms of the predefined transaction;

sending via said negotiation protocol a next offer that maximizes the agent's utility; wherein said next offer generation comprises:

generating a hypothetical sequence of proposed agent's offers and predicted opponent's counter offers by having every agent of a set of hypothetical agents negotiate with an associated opponent model, round after round until the offers are accepted or the negotiation is terminated; wherein the opponent model is part of a set of opponent models representing the opponent's profile and behaviors;

unifying the hypothetical sequence of the proposed agents' offers into a sequence of said next offers using an ensemble of experts applied to the hypothetical sequence of proposed agents' offers and the associated predicted opponent models' counter offers according to a current and a past performance measurement; wherein the performance measurement comprises:

the minimum difference between the opponent model's profile and behaviors and the opponent's ones, the minimum difference between the predicted opponent's offers and the opponent's actual ones, the minimum difference between the predicted offers sequence and the actual one, the maximum utility value that the proposed agent's offers can achieve; wherein said hypothetical agent and the associated opponent model negotiation process comprises:

selecting an offer, by the agent, to be submitted to the opponent model, to which the opponent model replies with a counter offer according to a reinforcement learning policy linked to the model; wherein the agent evaluates different offers by measuring the utility produced through the predicted development of the following rounds according to the opponent model's counter offers; wherein the agent's offer selection is determined by the application of adversarial search using the opponent model policy; wherein said opponent model policy maps states to actions; the opponent model is driven into an internal state upon the reception of the agent's offer determined by a reinforcement learning state transition function linked to the model, and reacts with an action according to said model policy;

wherein the single state identification comprises action, position and cognitive orientation;

wherein the action setting comprises:

transforming offers received from the agent into a direction and a magnitude; wherein the direction is associated to a midpoint's shift caused by the offer and counter-offer rounds sequence; wherein the midpoint represents for every round a halfway between the agent' and opponent's offers; wherein the shift represents the midpoint change between rounds; wherein the magnitude is generated by negotiation tactics functions adopted by the agent and the opponent model;

wherein the position setting comprises:

assigning a position value to the midpoint relatively to agent's preferences and opponent's estimated preferences;

wherein the cognitive orientation setting comprises:

assigning a cognitive orientation value to the opponent model according to the opponent's profile and behavior; wherein the cognitive orientation value selects said tactic functions, said state transition function and said policy to be linked to the opponent model;

wherein the opponent's action comprises said direction and said magnitude;

wherein said state transition function maps the agent's action, the position and the cognitive orientation to the opponent model state;

associating a deep neural network with LSTM cells to each opponent model; wherein said deep neural network models the policy and the state transition function of the opponent model;

simultaneously and incrementally training the deep neural networks with LSTM cells by inferring next state-action of the opponent models; wherein the training data are composed by sequence of said transformed state-action; wherein training data are dynamically updated for each model according to the sequence of said next offers generated by the ensemble of experts and the received actual offers transformed into said direction and said magnitude.

* * * * *